United States Patent Office 3,462,825
Patented Aug. 26, 1969

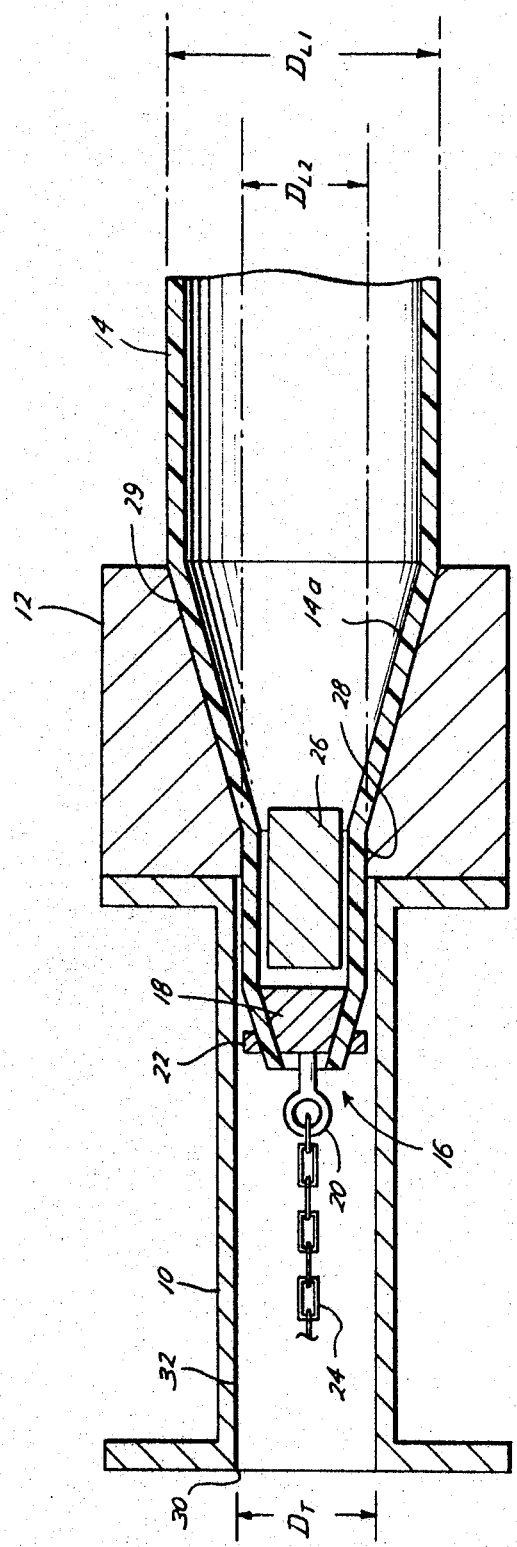

---

3,462,825
METHOD OF LINING TUBULAR MEMBERS
Gerald R. Pope and William R. Lott, Houston, Tex., assignors to John L. Dore Co., Houston, Tex., a corporation of Texas
Filed July 11, 1967, Ser. No. 656,623
Int. Cl. B23p *11/02, 19/00*
U.S. Cl. 29—451                2 Claims

ABSTRACT OF THE DISCLOSURE

An interiorly jacketed tubular member, particularly a flexible tube, wherein the jacket is a fluorocarbon liner having an initial outside diameter 10 to 15% greater than the inside diameter of the tubular member. The liner is placed in the tubular member by gripping one end of the liner and pulling it without application of heat through a reduction die and into the tubular member, releasing the liner, and then allowing the liner to expand into tight engagement with the inner wall of the tubular member.

BACKGROUND OF THE INVENTION

Methods for lining tubular members with fluorocarbon jackets are well known in the art. For example, United States Patent No. 3,050,786 discloses a method of tightly lining a tubular member with "Teflon" (polytetrafluoroethylene) by heating a length of sintered liner tubing to a temperature below its gel point, pulling the liner to reduce its diameter, cooling the liner to "freeze" it followed by insertion into a pipe, and then heating the liner once again to relax the strains in the liner to allow it to expand and conform with the interior of the pipe. Not to mention the cumbersome heating and cooling operations required, such method is useful only for small reductions in liner diameter or else excessive stresses may cause damage to the liner material.

Another example of a method for lining pipes with fluorocarbon material is illustrated in "Information Bulletin No. X–74a" published by the Polychemical Department of E. I. du Pont de Nemours and Co. In the DuPont process, the two ends of the liner are gripped and pulled in opposed directions at a specified rate in order to stretch or elongate the tube. After being stretched, the liner is released and forced into the pipe whereupon it is allowed to relax and expand into conformity with the interior of the pipe. Although no heating or cooling steps are required in such process, the ability of the process to reduce the diameter of the liner is quite limited since excessive elongation easily imparted by the diametric pulling forces creates distortion in the liner.

The disadvantages flowing from prior art methods of lining tubular members are underscored by inability of such lined pipe to withstand high vacuum without collapse of the liner. More importantly, the lining of flexible hose members by such prior art methods has met with only limited success since bending of the hose lined by such methods has inevitably resulted in liner collapse even at relatively large radiuses of bends. Thus a real need has existed in the art for a tightly lined tubular member which may effectively withstand vacuum conditions or bending (if flexible) while at the sime time enjoying the fluorocarbon properties of inertness to corrosive chemicals, heat and the like.

SUMMARY OF THE INVENTION

The present invention is directed to the provision of a tubular member tightly lined with a fluorocarbon jacket and a method for so lining the tubular member without the necessity of heating the liner to its forming temperature and without the consequent risk of imparting thermal stresses to the liner. The method herein is directed to the gripping and pulling of one end of the liner progressively through a reduction die to substantially reduce the diameter of the liner for easy insertion into a tubular member. Upon insertion, the liner is allowed to relax and expand into tight engagement with the inner wall of the tubular member. As a result, the lined tubular member may be used under heavy vacuum conditions and, if flexible, may be bent to very small radiuses of which prior art lined tubular members have not been capable in the past.

It is, therefore, an object of the present invention to provide a vastly improved fluorocarbon lined tubular member uniquely suited for not only the usual corrosive and high temperature applications, but capable of withstanding heavy vacuum.

A further object of the present invention is the provision of a fluorocarbon lined flexible hose having the usual properties of inertness to corrosive chemicals and heat which at the same time may be bent to much smaller radiuses by virtue of up to 300% more flexibility than prior art tubing.

Yet another object of the present invention is the provision of an extra-thermal method of tightly lining a tubular member with a fluorocarbon liner having an outside diameter substantially greater than the inside diameter of the tubular member wherein one end of the liner is gripped and progressively pulled through a reduction die and into the tubular member whereupon it is released and allowed to relax and expand into tight engagement with such tubular member.

Still another object of the present invention is the provision of a method for lining a tubular member with a liner having an initial outside diameter about 10 to 15% greater than the inside diameter of the tubular member.

Other and further objects, features and advantages will be apparent from the following description of presently preferred embodiments of the invention, given for the purpose of disclosure, and taken in conjunction with the accompanying drawing.

DESCRIPTION OF THE DRAWING

In the drawing forming a part of the disclosure herein, the figure is a cross-sectional elevational view illustrating the process according to the present invention for inserting a fluorocarbon liner into a tubular member.

DESCRIPTION OF THE PREFERRED EMBODIMENT

The present invention generally is directed to the lining of pipe or flexible tubing with a fluorocarbon liner having an initial outside diameter about 10 to 15% greater than the inside diameter of the tubular member. The process may be carried out at room temperature without any heating of the liner to form it or relax it. By way of summary, the tubing is gripped firmly at one end and pulled through a reduction die into the pipe. When the liner is properly positioned within the pipe, both ends are released to allow it to relax and expand into secure engagement with the pipe's inner wall.

Referring now to the drawing, the pipe or tubular member 10 to be lined is positioned adjacent the outlet or forward end of the reduction die 12 and both are suitably anchored by means not shown. Then a fluorocarbon tube or liner 14 is gripped at one end by plug means 16 for axial tensioning and pulling of the liner.

The plug means 16 comprises a plug member 18 having a forwardly tapering periphery which engages the end of the liner 14. The plug 18 is provided with a pull 20 which, as shown, may take the form of an "eye." The end of the liner 14 is tightly clamped about the plug 18 by means of a strap 22 which preferably has its inner surface tapered forwardly as shown to conform with the taper of the plug 18. Thus when the end of the liner 14 is placed over the plug 18, the strap 22 is placed about the liner and a cable 24 secured to the pull 20 is pulled in the forward direction (shown by the arrow) so that the liner is securely wedged between the plug 18 and the strap 22. It should be noted at this point that the end of the liner 14 preferably may have slight serrations in the end engaging the plug 18 to avoid crimping once the plug 18 is pulled tightly into engagement with the liner 14 and strap 22. Also, an auxiliary plug 26 preferably is inserted behind the main plug 18 to prevent initial collapse of the liner 14 as the pulling operation is begun.

When the liner 14 is properly secured to the plug means 16 as just described, the cable 24 is threaded through the reduction die 12 and through the pipe 10. Then, as tension in the cable is increased, the liner 14 is pulled through the reduction die 12 and its outside diameter is reduced to the size of the forward restrictive opening 28 of the die.

The liner 14 is progressively pulled through the reduction die 12 and into the pipe or tubular member 10 as tension in the cable 24 is maintained and the pulling force exerted on the liner 14 passing through the reduction die 12 creates a back pressure or stress within the constricted portion of the liner 14a as it enters the die. Such stress forces induced in the liner 14 remain as long as pulling force of the cable 24 maintains tension on the liner. Once the liner has been drawn completely into and through the pipe or tubular member 10 and the plug means have been pulled through the forward end 30 of the tubular member 10, the pulling force of the cable 24 is stopped causing relaxing of stresses induced in the liner 14 during the drawdown operation. After a sufficient period of time, the liner 14 will then expand into conformity with the interior surface 32 of the tubular member 10.

As indicated in the drawing, the initial outside diameter of the liner 14 is represented by the reference character $D_{L1}$. Such diameter is reduced to $D_{L2}$ by the constriction 28 of the die 12. Finally, upon completion of the drawdown operation and release of tension in the cable 24, driving force of relaxing of stresses induced in the liner causes the liner to expand to an outside diameter $D_T$ which is equal to the inside diameter of the tubular member 10. It is preferable that $D_{L2}$ be only slightly less than $D_T$ but enough to permit adequate clearance of the liner 14 as it is pulled into the tubular member 10. Such clearance, of course, obviates frictional contact of the liner with the pipe wall that would increase horsepower requirements in the drawdown operation.

The rate of pulling of the liner 14 through the reduction die 12 is not critical so long as it is not so rapid or erratic that distortion of the forward end of the liner occurs. Also, as is well known in the pipe lining art, very small apertures may be drilled through the sides of the pipe or tubular member 10 in order to permit escape of air as the liner 14 expands into engagement therewith. Additionally, it will be recognized that it is desirable to provide at least several inches of liner material protruding from both ends of the pipe or tubular member 10 in order to permit the usual flaring engagement thereof with any flanged ends of the pipe.

As an example of the present invention, a pipe or tubular member 10 was lined according to the method described herein, such pipe being Schedule 40 steel pipe having an inside diameter of 2.062 inches. It was lined with a fluorinated ethylenepropylene resin liner having an initial outside diameter of 2.30 inches with a wall thickness of 0.070 inch. The liner was drawn through a reduction die 12 having a restrictive aperture 28 of 1.850 inches with a reduction taper surface 29 having an average incline of 10°. Thus as the liner was pulled through the reduction die, there was approximately a 1/32 inch clearance between the liner and the inside of the pipe. Upon release of pulling tension in the cable 24, the liner immediately expanded and after a few hours had fully relaxed into very tight engagement with the interior of the tubular member 10. Such lined pipe performed satisfactorily even under total vacuum without collapse. Of course, in comparing the initial outside diameter of the liner 14 in the example ($D_{L1}$) to the inside diameter of the pipe 10 ($D_T$), it will be recognized that the outside diameter of the liner was 10.3% greater than the inside diameter of the tubular member.

As a further illustration of the outstanding advantages of the present invention, a flexible metal interlock type hose was substituted for the pipe 10 in the previous example and lined according to the process just illustrated. The resulting lined flexible hose was capable of being bent without liner collapse in radiuses as small as 1/3 of bend radiuses of conventionally lined flexible hoses. In other words, flexibility increased approximately 300% over prior art lined hoses. It will be recognized certainly that other types of hoses such as rubber or spiral spring corrugated hoses may be used as tubular members to receive the liner.

An added advantage of the present invention resides in the resistance of liners described herein to thermal expansion. Upon application of heat during use of a liner with a tubular member according to the present invention, at least initial heating causes liner stresses to relax, rather than causing the liner to expand. Such advantage is important in situations wherein thermal expansion cannot be tolerated to any significant degree.

Although the invention has been described by examples relating to fluorinated ethylenepropylene resin, it will be recognized that other fluorocarbon materials may be used such as Teflon, a polytetrafluoroethylene resin, Fluorothene, a polychlorotriflluoroethylene, Kel-F, a polymerized trifluorochloroethylene resin, etc. While liners having an initial outside diameter of up to 25% or more than the inside diameter of pipes to be lined can be drawn down according to the present invention, it is preferred that liners of about 10 to 15% greater initial outside diameter be used since any increased reduction in diameter simply requires excessive pulling force to achieve only nominally better results and at more expense from the standpoint of material costs since larger diameter liners naturally cost more than smaller diameter liners. The wall thickness of liners useful in the present invention is not critical so long as it is great enough to permit the liner to be pulled through the reduction die without significant distortion in the liner material. Again, excessive wall thickness merely increases the pulling force required with only nominally better resistance to collapse in use.

Thus provided by the present invention is a lined pipe or a lined flexible hose in which the liner is drawn into the pipe or hose at room temperature thereby avoiding permanent distortion normally caused by heating during forming in conventional techniques. Similarly, the method according to the present invention permits the use of a liner having an initial outside diameter at least about 10 to 15% greater than the pipe to be lined as compared to significantly smaller diameter liners capable of being inserted in pipes by prior art methods. The overall result is that the lined pipe or flexible hose will not collapse when bent or when subjected to vacuum.

The present invention, therefore, is well adapted to carry out the objects and attain the ends and advantages mentioned as well as those inherent therein. While presently preferred embodiments of the invention are given for the purpose of disclosure, numerous changes in the details of construction and arrangement of parts can be made which will readily suggest themselves to those skilled in the art and which are encompassed within the spirit of the invention and the scope of the appended claims.

What is claimed is:

1. The extra-thermal method of tightly lining a tubular member with a fluorocarbon resin liner having an outside diameter substantially greater than the inside diameter of the tubular member, comprising the steps of,
  securely gripping one end of the liner for axial tensioning and pulling,
  progressively pulling the liner through a reduction die for reducing said liner to an outside diameter slightly less than the inside diameter of the tubular member and then through and into the tubular member without relaxing the pulling tension,
  releasing the gripped end of the liner, and
  allowing the freed liner to expand into tight engagement with the inner wall of the tubular member.

2. The method of claim 1 wherein the liner prior to being pulled into the tubular member has an initial outside diameter about 10 to 15% greater than the inside diameter of said tubular member.

References Cited

UNITED STATES PATENTS

| 1,708,141 | 4/1929 | Kepler | 29—451 X |
| 2,088,922 | 8/1937 | Porteous | 138—140 X |
| 2,249,510 | 7/1941 | Welker | 29—451 |
| 3,104,432 | 9/1963 | Peterson. | |
| 3,239,931 | 3/1966 | Guarnaschelli | 138—140 X |

FOREIGN PATENTS 575,424   5/1959   Canada.

CHARLIE T. MOON, Primary Examiner

U.S. Cl. X.R.

29—234, 235; 138—140; 264—249